United States Patent [19]
Zeck

[11] Patent Number: 5,807,112
[45] Date of Patent: Sep. 15, 1998

[54] EDUCATIONAL DOLL

[76] Inventor: Paula J. Zeck, 7516 Greenfield Ave., Castalia, Ohio 44824

[21] Appl. No.: 799,111

[22] Filed: Feb. 11, 1997

[51] Int. Cl.⁶ ................................................. G09B 19/00
[52] U.S. Cl. ............................................ 434/127; 446/72
[58] Field of Search ..................... 434/127, 236; 446/268, 296, 304, 386, 72, 147, 75

[56] References Cited

U.S. PATENT DOCUMENTS

| | | |
|---|---|---|
| 3,546,789 | 12/1970 | Kushell et al. . |
| 3,800,436 | 4/1974 | Matzek . |
| 3,949,488 | 4/1976 | Welch . |
| 4,197,670 | 4/1980 | Cox . |
| 4,411,096 | 10/1983 | Smith . |
| 4,499,678 | 2/1985 | Moreau ................................ 446/72 X |
| 4,565,536 | 1/1986 | Vairo ...................................... 446/305 |
| 4,911,670 | 3/1990 | McNicholas et al. . |
| 4,950,194 | 8/1990 | Gullace ..................................... 446/72 |
| 5,033,985 | 7/1991 | Nahas ....................................... 446/224 |
| 5,059,149 | 10/1991 | Stone ..................................... 446/72 X |
| 5,062,645 | 11/1991 | Goodman et al. .................. 434/127 X |
| 5,187,958 | 2/1993 | Ward et al. . |
| 5,194,030 | 3/1993 | LeBoeuf et al. . |
| 5,197,885 | 3/1993 | Friedel ............................... 446/268 X |

*Primary Examiner*—Jeffrey A. Smith
*Attorney, Agent, or Firm*—Chase & Yakimo

[57] ABSTRACT

A doll having body features and garb indicative of a selected food product. A storage compartment, e.g., as a pouch, is incorporated into the doll's clothing so as to contain a booklet containing nutritional information about the food product. The booklet is in the form of the food product and may contain either printed information about the food product or prerecorded information on a speech module assembly which is attached to the booklet. A tether is attached at one end to the doll and extends into the pouch with the booklet releasably attached to a second end of the tether. The tether allows the booklet to be positioned within the pouch and displaced therefrom without separation of the booklet from the doll.

20 Claims, 5 Drawing Sheets

EDUCATIONAL DOLL

BACKGROUND OF THE INVENTION

This invention relates to an educational toy and, more particularly, to an educational doll having a configuration and/or garb and/or information indicative of a selected food product.

Due to today's burgeoning interest in various health issues, nutritional/diet issues are becoming more important. It is understood that an early instillation of food awareness and their nutrition are effective in developing a lifelong devotion to a nutritional lifestyle. Thus, it is desirable, if not necessary, to teach children about nutrition early on in their development.

It is known that dolls are very effective for obtaining a child's attention. Although dolls somewhat related to food products may be available, such as Mr. Potato Head, these dolls offer no nutritional, educational value. More importantly, there are no dolls to associate an educational, nutritional message about a selected food product, as represented by an associated doll, the message secured to the doll in such a manner as not to interfere with doll play but available to the child upon demand. Thus, there is a need for dolls which present a nutritional food product and readily offer nutritional information associated with the selected food product.

In response thereto I have invented a doll for educating children about nutritional issues, the doll being either in the form of a selected food product shape and/or having a garb indicative of the selected food product and/or having video or audio nutritional information connected thereto about the selected food product. My preferred doll presents an elastic tether having one end attached to the doll with the other end attached to the selected food product information, the food product information being releasably insertable into a pocket, pouch, purse or the like associated with each doll. Accordingly, the child will first be able to ascertain the type of food product represented by the doll either by the food product configuration or the doll's garb and then be provided printed and/or other audio nutritional information concerning the food product, such information being releasably attached to an end of the tether.

It is therefore a general object of the invention to provide an educational toy for teaching children about nutritional issues.

Another object of this invention is to provide a toy, as aforesaid, in the form of a doll, the doll having a shape and/or garb and/or information associated therewith indicative of a selected food product.

Another object of this invention is to provide a doll, as aforesaid, the doll having informational materials associated therewith, the materials displaying visual and/or printed information about the selected food product.

A further particular object of this invention is to have a doll, as aforesaid, the food product information releasably connected at one end to a tether to the doll.

Still a further object of this invention is to provide a compartment for storage of the food product information on the doll.

Another particular object of this invention is to provide a food product, as aforesaid, the tether being of an elastic material to allow the food product information to be displaced from the storage compartment of the doll.

Other objects and advantages of this invention will become apparent from the following description taken in connection with the accompanying drawings, wherein is set forth by way of illustration and example, a now preferred embodiment of this invention.

DESCRIPTION OF THE PREFERRED EMBODIMENT

Figure 1:
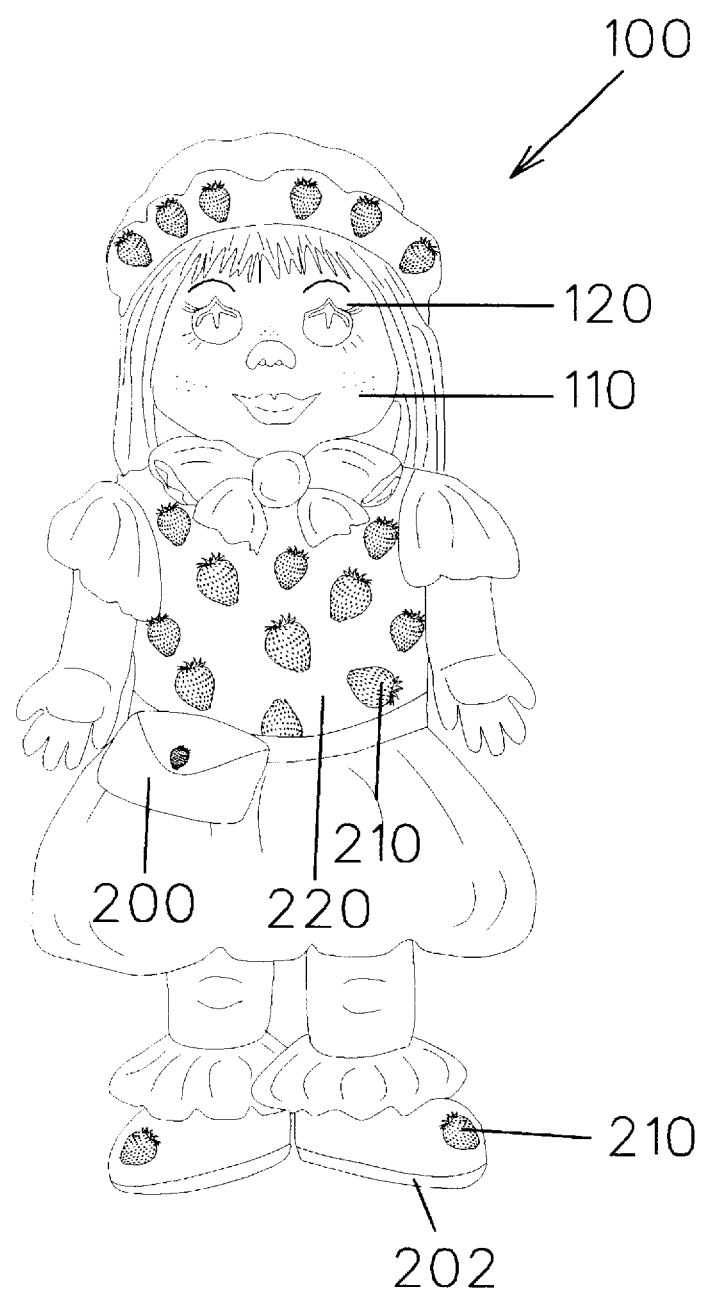
FIG. 1 is a front view showing one type of doll configured to be indicative of a strawberry food product, the doll clothed with strawberry indicative garb.
Figure 2:
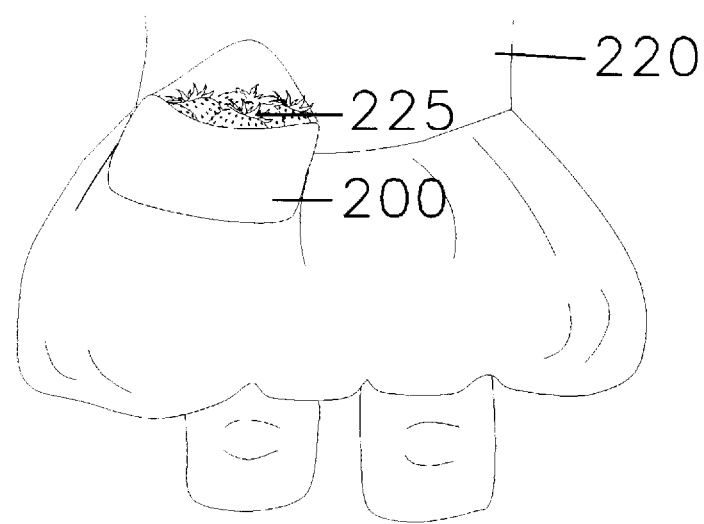
FIG. 2 is a fragmentary diagrammatic view of a storage compartment of the doll of FIG. 1 in the form of a pouch on the doll to contain representations of the selected food product.

Turning more particularly to the drawings, FIG. 1 shows a doll 100 representative of a strawberry food product as represented by the strawberry-configured face 110, leaf-like eyelids 120 as well as the dress-like garb 220 and shoes 202 having strawberry indicia 210 thereon. It is understood that the doll may be configured to represent a certain selected food product as well as drabbed with garb indicative of the same. The doll proper may be of any suitable material. Accordingly, the association between the doll and the selected food product, e.g. the selected strawberry, will become obvious to children.

Further associated with each doll is a pouch 200 or other storage compartment means for storing articles therein, such as a pocket, purse, wallet, etc. Within the pouch 200 are further articles indicative of the food products, in this case a bunch of strawberries 225. A booklet 250 containing graphic information indicative of the strawberry food product may either be singly stored in the pouch 200 or incorporated in the strawberry bunch 225. It is preferred that the booklet 250 have a strawberry configured perimeter 260 so as to present a strawberry profile when closed. The booklet 250 will have nutritional strawberry information printed thereon. Alternatively, a speech module assembly 252 may be used in form of the booklet, the speech module assembly having a voice chip with prerecorded information thereon about strawberries. This audio information will be relayed to the user upon pressure being exerted thereon.

Figure 3:
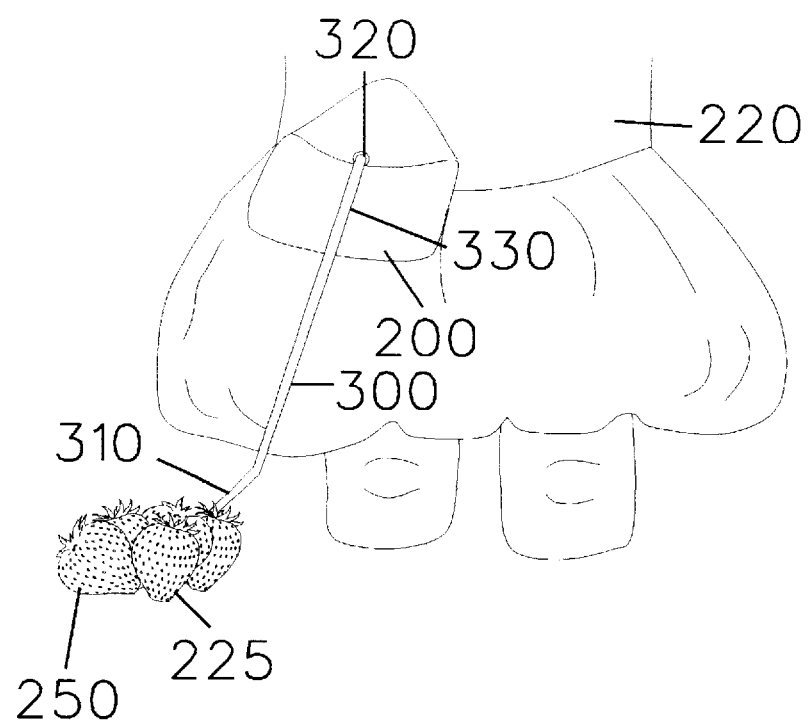
FIG. 3 is a view as in FIG. 2 showing the tether extending from the pouch of the doll, the selected food product being displaced from the doll.
Figure 4:
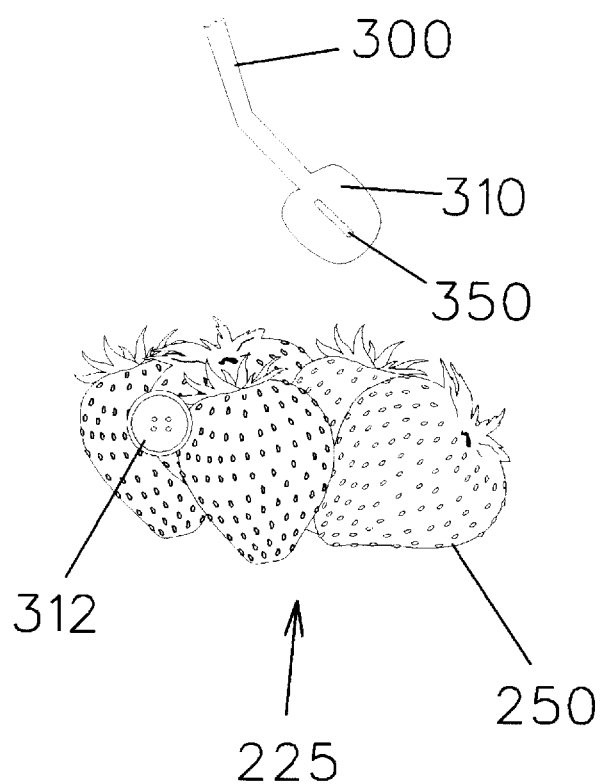
FIG. 4 illustrates the means of connection of representative strawberries to the tether.
Figure 5:
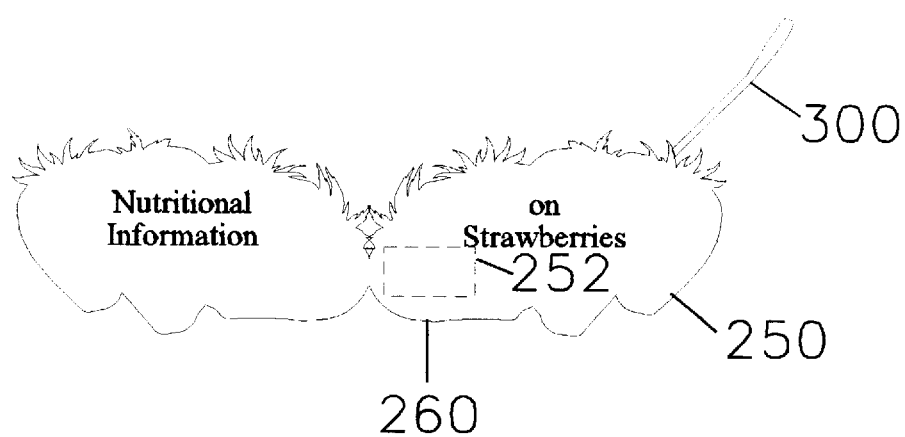
FIG. 5 shows a representative strawberry being displayed in a booklet form with the nutritional information thereon.
Figure 1:
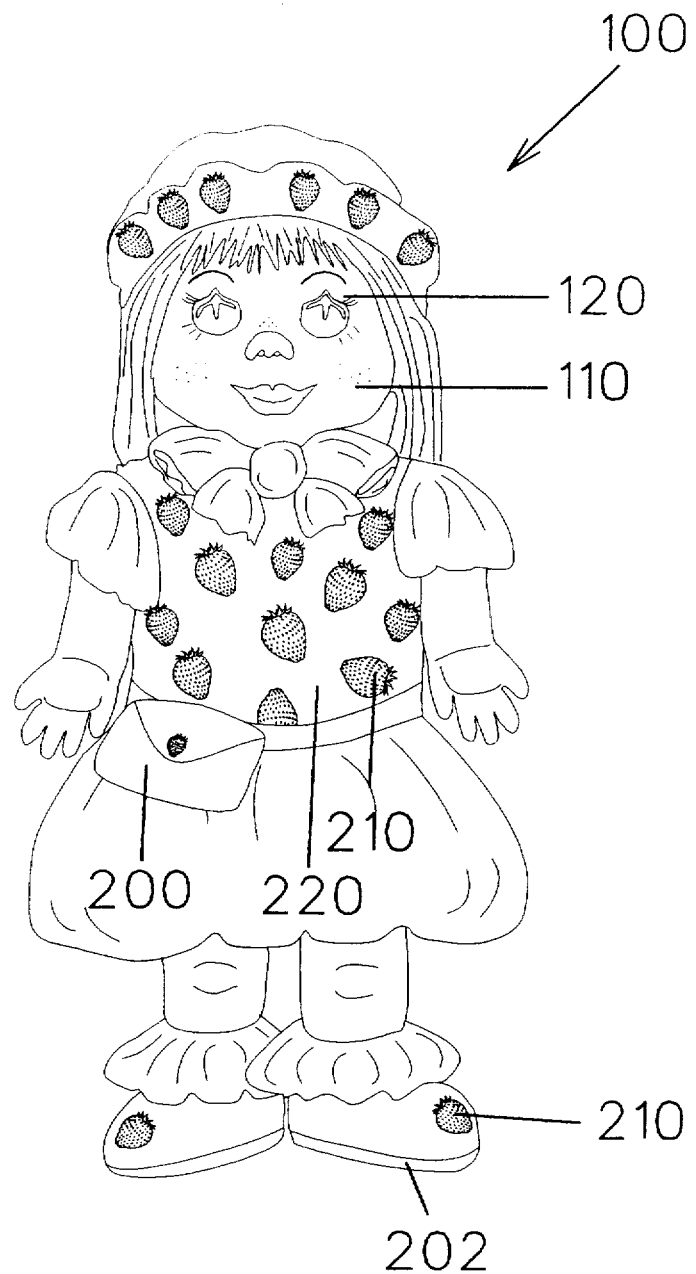
Figure 2:
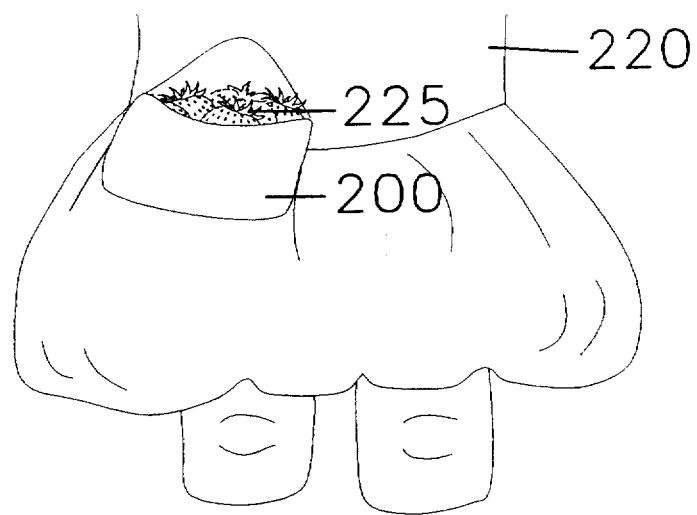
Figure 3:
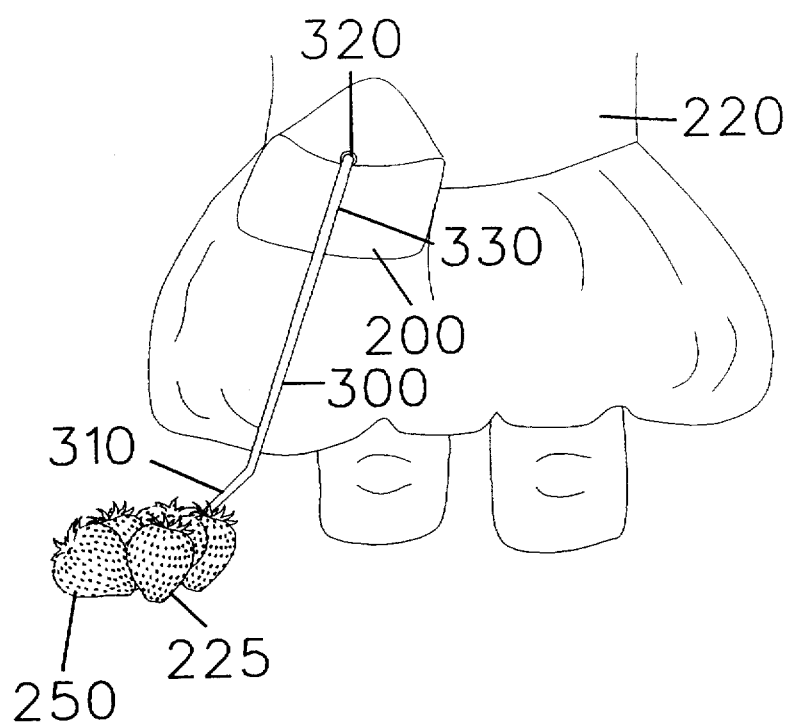
Figure 4:
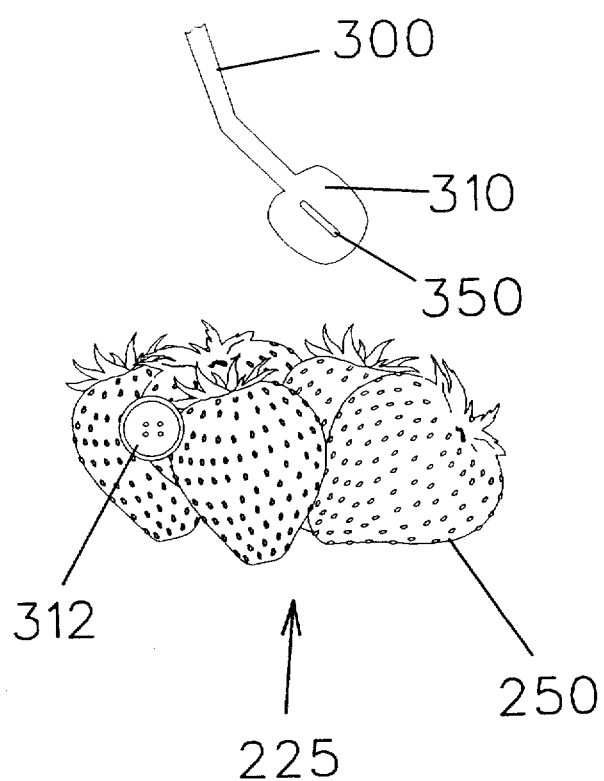
Figure 5:
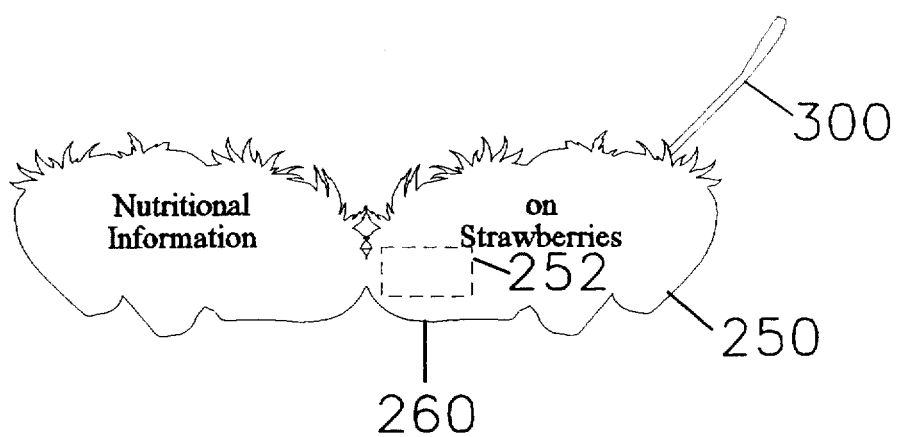

Attached at one end 330 to the doll 100 is an elasticized tether 300 which extends through a hole 320 in pouch 200 so as to allow the opposed flared tether end 310 to be stored in the pouch 200 or other compartment. The tether 300 presents a button hole 350 at the flanged end 310 thereof for engagement with a button 312 affixed to the strawberries 225, booklet 250 or the like. Thus, the informational booklet 250 can be connected to the doll and stored in the pouch 200 so as to not interfere with the doll during play. Upon the child desiring to obtain the nutritional information about the strawberry, the booklet 250 may be removed from the pouch 200, the elasticity of the tether 300 allowing such booklet to be displaced from the doll 100 proper as shown in FIG. 3.

Although a strawberry food product has been selected it is understood that various other food products may be selected, e.g. pumpkins, apples, etc.

It is also to be understood that while a certain form of this invention has been illustrated and described, it is not limited thereto except insofar as such limitations are included in the following claims and allowable functional equivalents thereof.

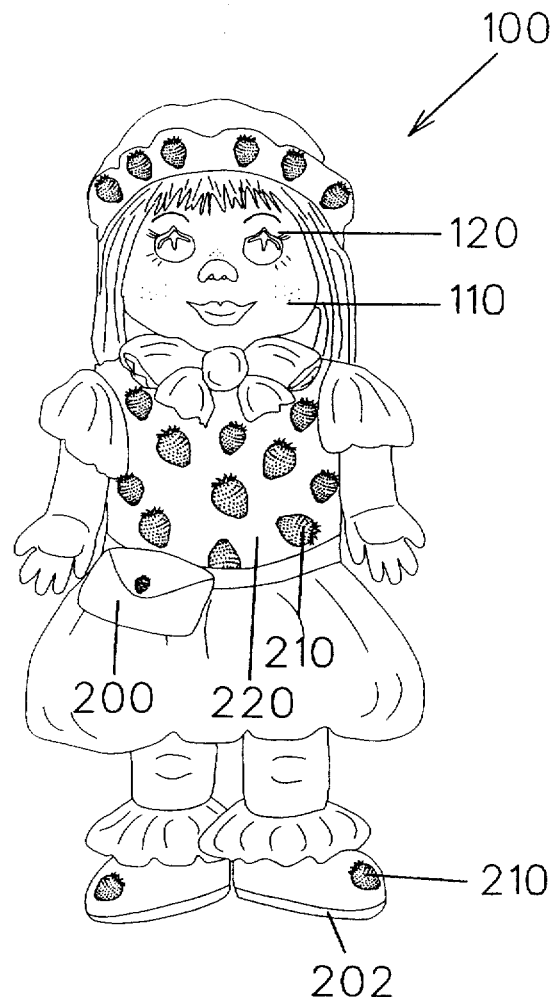

Having thus described the invention, what is claimed as new and desired to be secured by Letters Patent is as follows:

1. A doll kit for teaching children information about a selected food product comprising:

a doll having at least one body feature indicative of a selected food product;

a doll clothing ensemble indicative of the selected food product;

a storage compartment on said doll;

graphic means insertable in said compartment for representing the selected food product;

a tether having first and second ends with said first end attached to said doll and said second end attached to said graphic means;

said tethered graphic means releasably removable from and insertable into said storage compartment.

2. A doll kit as claimed in claim 1, wherein said body feature comprises a face of said doll configured to indicate the selected food product.

3. A doll kit as claimed in claim 2, wherein the selected food product is a strawberry.

4. A doll kit as claimed in claim 1, wherein said graphic means comprises a booklet, said booklet having information thereon about the selected food product.

5. A doll kit as claimed in claim 4, wherein said booklet is configured to resemble the selected food product.

6. A doll kit as claimed in claim 4, wherein said booklet includes a speech module assembly, said speech module assembly having prerecorded information about the selected food product.

7. A doll kit as claimed in claim 1, wherein said tether extends through a surface of said storage compartment adjacent said doll.

8. A doll kit as claimed in claim 1, wherein said tether comprises an elastic material for displacing said graphic means from said compartment and said doll.

9. A doll kit as claimed in claim 1, wherein said storage compartment comprises a pouch.

10. A doll kit as claimed in claim 9, wherein said pouch includes a surface adjacent said doll, and an aperture in said surface for allowing extension of said tether therethrough, said surface intermediate said first and second tether ends with said tether second end in said pouch upon said insertion of said graphic means in said pouch.

11. A doll kit as claimed in claim 10, where said tether comprises an elastic material to allow displacement of said tether second end from said pouch and away from said doll.

12. A doll kit as claimed in claim 1, further comprising fastener means for releasably attaching said graphic means to said tether second end.

13. A doll kit as claimed in claim 12, wherein said fastener means comprises:

an aperture at said tether second end and;

a fastener on said graphic means for releasable engagement with said aperture.

14. A doll kit as claimed in claim 13, wherein said fastener comprises a button releasably engageable with said aperture.

15. A doll kit for teaching children information about a selected food product comprising:

a doll having at least one body feature indicative of a selected food product;

a storage compartment on said doll;

graphic means insertable in said compartment for representing the selected food product;

a tether having first and second ends with said first end attached to said doll and said second end attached to said graphic means;

a female fastener at said tether second end;

a male fastener on said graphic means for releasable engagement with said female fastener;

said tethered graphic means releasably removable from and insertable into said storage compartment.

16. A doll kit as claimed in claim 15, wherein said graphic means comprises a booklet, said booklet having information thereon about the selected food product.

17. A doll kit as claimed in claim 16, wherein said booklet is configured to resemble the selected food product.

18. A doll kit as claimed in claim 17, wherein said booklet includes a speech module assembly, said speech module assembly having prerecorded information about the selected food product.

19. A doll kit for teaching children information about a selected food product comprising:

a doll having at least one body feature indicative of a selected food product;

a doll clothing ensemble indicative of the selected food product;

a storage compartment on said doll;

a booklet in said compartment configured to represent the selected food product, said booklet including information about the selected food product;

an elasticized tether having first and second ends with said first end attached to said doll and said second end attached to said booklet;

said tethered booklet releasably removable from and insertable into said storage compartment.

20. A doll kit as claimed in claim 19, wherein said booklet includes a speech module assembly, said speech module assembly having prerecorded information about the selected food product.

* * * * *

UNITED STATES PATENT AND TRADEMARK OFFICE
CERTIFICATE OF CORRECTION

PATENT NO. : 5,807,112
DATED : Sep. 15, 1998
INVENTOR(S) : Paula J. Zeck

It is certified that error appears in the above-identified patent and that said Letters Patent is hereby corrected as shown below:

The title page should be deleted to appear as per attached title page.

Please delete drawing sheets 1-5 and substitute drawing sheets 1-5 as per attached.

Signed and Sealed this

Fifth Day of January, 1999

Attest:

Attesting Officer

Acting Commissioner of Patents and Trademarks

United States Patent [19]
Zeck

[11] Patent Number: 5,807,112
[45] Date of Patent: Sep. 15, 1998

[54] EDUCATIONAL DOLL

[76] Inventor: Paula J. Zeck, 7516 Greenfield Ave., Castalia, Ohio 44824

[21] Appl. No.: 799,111

[22] Filed: Feb. 11, 1997

[51] Int. Cl.$^6$ .................................................. G09B 19/00
[52] U.S. Cl. ............................................. 434/127; 446/72
[58] Field of Search ................................ 434/127, 236; 446/268, 296, 304, 386, 72, 147, 75

[56] References Cited

U.S. PATENT DOCUMENTS

| | | |
|---|---|---|
| 3,546,789 | 12/1970 | Kushell et al. . |
| 3,800,436 | 4/1974 | Matzek . |
| 3,949,488 | 4/1976 | Welch . |
| 4,197,670 | 4/1980 | Cox . |
| 4,411,096 | 10/1983 | Smith . |
| 4,499,678 | 2/1985 | Moreau ............................ 446/72 X |
| 4,565,536 | 1/1986 | Vairo ................................. 446/305 |
| 4,911,670 | 3/1990 | McNicholas et al. . |
| 4,950,194 | 8/1990 | Gullace ............................. 446/72 |
| 5,033,985 | 7/1991 | Nahas ................................ 446/224 |
| 5,059,149 | 10/1991 | Stone ................................ 446/72 X |
| 5,062,645 | 11/1991 | Goodman et al. ................ 434/127 X |
| 5,187,958 | 2/1993 | Ward et al. . |
| 5,194,030 | 3/1993 | LeBoeuf et al. . |
| 5,197,885 | 3/1993 | Friedel ............................. 446/268 X |

*Primary Examiner*—Jeffrey A. Smith
*Attorney, Agent, or Firm*—Chase & Yakimo

[57] ABSTRACT

A doll having body features and garb indicative of a selected food product. A storage compartment, e.g., as a pouch, is incorporated into the doll's clothing so as to contain a booklet containing nutritional information about the food product. The booklet is in the form of the food product and may contain either printed information about the food product or prerecorded information on a speech module assembly which is attached to the booklet. A tether is attached at one end to the doll and extends into the pouch with the booklet releasably attached to a second end of the tether. The tether allows the booklet to be positioned within the pouch and displaced therefrom without separation of the booklet from the doll.

20 Claims, 5 Drawing Sheets